April 25, 1967     A. E. HORDLEY ETAL     3,315,940
SERVO-ACTUATING MECHANISMS
Filed Oct. 9, 1964
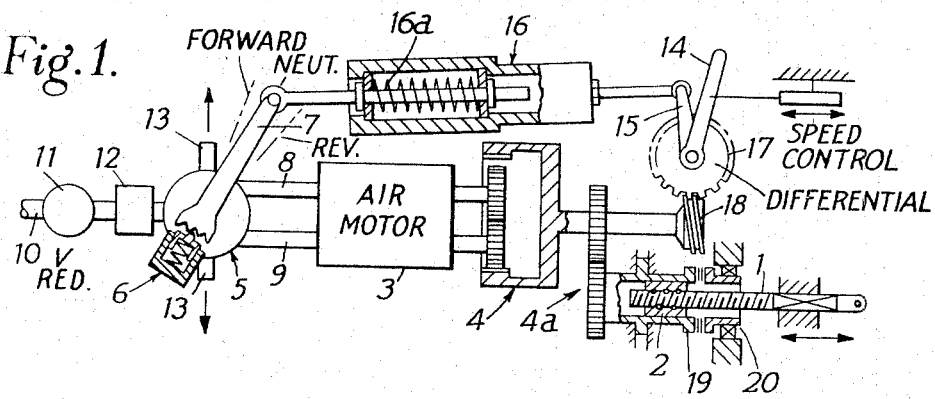
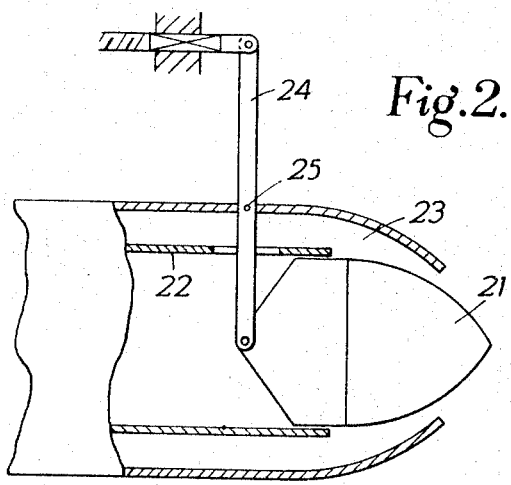
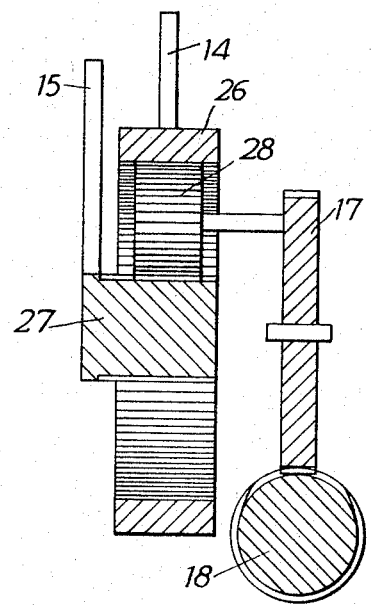

United States Patent Office 3,315,940
Patented Apr. 25, 1967

3,315,940
SERVO-ACTUATING MECHANISMS
Albert Edward Hordley, Locksheath, Southampton, and Peter Bruno Kahn, Catisfield, Fareham, England, assignors to Plessey-UK Limited, Ilford, England, a British company
Filed Oct. 9, 1964, Ser. No. 402,971
Claims priority, application Great Britain, Oct. 17, 1963, 41,056/63
2 Claims. (Cl. 253—1)

This invention relates to servo-actuating mechanism and has for an object to provide improved actuating mechanism which in response to selective movement of a control member will move a controlled member rapidly to a predetermined corresponding position and then retain it in that position until further movement is required due to further displacement of the control member. According to the invention in its broadest aspect the controlled member is moved by a reversible servo-motor which is energised for movement in one or the other direction or de-energised according to the position of a three-position switch member which is associated with indexing means effective in each of its three positions to prevent substantial movement from each of the said positions towards another position until the force or torque applied reaches a predetermined value, the said switch member being coupled by a bi-directional spring element to an element which is differentially connected to a primary control member and to a feed-back member coupled with the controlled element in such manner as to assume a neutral position whenever the control member and the controlled member are in positional correspondence.

While the invention can be applied to other control problems, it has been particularly developed with a view to providing a control suitable for ram-jet engine nozzle-plug actuator. Such actuator is required to move a plug in the exit nozzle of a ram-jet engine so as to vary the exit-nozzle area with a view to controlling the mass flow of the engine and thereby the speed of the aircraft. The nozzle plug has a limited travel, and the actuator must be capable of moving the plug to any position selected within the range of total movement and maintaining it in the selected position against a unidirectional load of variable magnitude.

FIGURE 1 of the accompanying drawings diagrammatically illustrates a plug actuator for the nozzle of a ram-jet engine, which incorporates one form of the present invention, FIGURE 2 shows a plug in a nozzle of a ram-jet engine partly in section, and FIGURE 3 shows diagrammatically, and on an enlarged scale, details of a differential device forming a part of the actuator of FIGURE 1.

Referring now to the drawings, the nozzle plug 21, shown only in FIGURE 2, is connected to a lead-screw element 1, visible in FIGURES 1 and 2, which is prevented from rotation about its axis but is capable of longitudinal movement under the action of a ball nut 2, which itself is capable of rotation but prevented from axial movement. As can be seen in FIGURE 2 the nozzle plug 21 is slidably mounted in a cylinder 22 which is supported within an exit nozzle 23 of a ram-jet engine in well known manner. The nozzle plug 21 is coupled to the lead screw element 1 via an arm 24 pivotal about a fulcrum 25 intermediate its ends. Thus longitudinal movement of the lead-screw element 1 causes the arm 24 to pivot about the fulcrum 25 and so to displace the nozzle plug 21 longitudinally in the exit nozzle 23. An air motor 3, for example a Roots-type air motor, is coupled to the ball nut 2 by a reduction-gear set 4, 4a and has associated with it a three-position selector valve 5, which is operable by a lever 7 having three positions and which is equipped with spring indexing means 6 tending to resiliently retain said lever 7, in any one of its three positions. The three positions are the illustrated neutral position, in which the air motor 3 is isolated, and two outer positions indicated by chain-dotted lines and respectively marked FRWD (i.e. forward) and REV (i.e. reverse), in each of which a respective one of two air motor connection lines 8 and 9 is connected to a compressed-air inlet line 10 containing a reducing valve 11 and a filter 12 and the other line 9 or 8 is connected to one or both of two exhaust connections 13 according to the selected position, thus causing the air motor to be driven with maximum torque in the selected direction. The input member of the device is an input-control or speed-control lever 14, which is coupled to one element of a differential device of which a second element coupled to a lever 15 is resiliently connected to the control lever 7 of the valve 5 by a double-acting spring link 16. The differential device is shown in greater detail in FIGURE 3 from which it can be seen that one element, to which is coupled the speed control lever 14, is an annular sun wheel 26 of an epicyclic gear drive of which a second inner sun wheel 27 is said second element coupled to the lever 15. The differential device also comprises a planet wheel 28 carried by a planet carrier or third element 17 which is constructed as a worm gear co-operating with a worm 18 rotatable with one of the elements of the gearing 4, 4a that transmits movement from the air motor 3 to the ball nut 2. While if desired the nut 2 could be an ordinary contact nut and the pitch of the lead screw on element 1 could be so selected as to make drive from the nut 2 to the screw 1 inherently irreversible, it is preferred to employ a low-friction transmission including a ball nut, and to render the latter drive irreversible by coupling the nut 2 by a spring-loaded friction clutch 19 to the movable element of a unidirectional locking device 20, this element being thus rotatable with the nut in the direction opposing the unidirectional load acting upon the plug and member 1 but prevented from rotation in the opposite direction. The spring-loaded clutch 19 will then allow the nut to be rotated by the motor 3 to produce movement of the element 1 in the direction of its load, by overcoming the loading of the clutch 19, which is so selected as to withstand the torque which would be exerted by the maximum load acting upon the element 1.

In operating the actuator and assuming that the lever 7 is initially in its neutral position so that the air motor is isolated, if it is required to move the nozzle plug 21 forwardly, say, the speed-control lever 14 is moved in an appropriate direction. This direction may be clockwise as viewed from the right in FIGURE 3 whereupon, due to the fact that the air motor is at present isolated, and hence the planet carrier 17 is stationary, the planet wheel 28 will rotate clockwise about a stationary axis, thereby rotating the sun wheel 27 in the anti-clockwise direction. In this way the lever 15 is displaced anti-clockwise but due to the spring indexing means 6 this displacement of lever 15 is not initially transmitted to the lever 7 but first compresses a spring 16a forming part of the double-acting spring link 16. After a predetermined amount of movement of the lever 15, however, the compressive force of the spring 16a overcomes the retaining force of the spring indexing means 6 and causes the lever 7 to be rapidly moved from its neutral position to its forward position to produce maximum torque of the air motor 3 in the forward direction. When this occurs the air motor 3 drives the worm 18 in a direction to drive the planet carrier 17 in a clockwise direction as viewed from the right in FIGURE 3. Thus the axis of the planet wheel 28 is displaced clockwise and once the sun wheel 26 is stationary, i.e. when the lever 14 has been moved to a required position according to desired movement of the nozzle plug 21, the clockwise displacement of the axis of the planet wheel 28 causes said planet wheel to rotate anti-clockwise about its axis, thereby to rotate the sun wheel 27 clockwise. Hence the lever 15 is returned towards its original position. Due to the presence of the double-acting spring link 16 this return movement of the lever 15 is again not initially transmitted to the lever 7 but again compresses the spring 16a whilst the air motor 3 continues to drive the nozzle plug 21, until the compressive force of the spring 16a again overcomes the retaining force of the spring indexing means 6. Provided that the retaining forces produced in each position by the spring indexing means 6 are substantially equal to the lever 7 is returned just as rapidly to the neutral position whereupon the air motor 3 is again isolated and movement of the planet carrier 17 and of the nozzle plug 21 ceased. During operation of the air motor 3 the nozzle plug 21 is moved via the reduction gear set 4, 4a, bull nut 2, lead screw element 1 and arm 24 to a position corresponding to the new position of the input lever 14.

In order to move the nozzle plug 21 in the reverse direction the speed-control lever 14 is moved in the reverse direction and the various movements described above are all reversed in sense. Thus movement of the speed-control lever 14 in either direction causes, after a certain time delay, movement of the nozzle plug 21 in the appropriate direction and for a distance dependent upon the extent of said movement of the lever 14, and both switching on and switching off of the air motor occurs rapidly irrespective of the rate of movement of said lever 14.

What we claim is:

1. Servo-actuating mechanism comprising a controlled member, a reversible servomotor operatively connected to said controlled member, a three position switch for selectively energising said reversible servomotor in one or a reverse direction or de-energising said servomotor, a primary control member for determining the position of said controlled member, an element differentially coupled to said primary control member, a bi-directional spring link coupling said element to said switch, indexing means for holding said switch in any of its three positions and such that a force due to movement of said element in a sense to displace said switch from one position to another is initially imparted to said spring link and resisted by said indexing means to hold said switch in said one position until said element has been moved by a predetermined amount, and feed back means coupled to said controlled member and differentially coupled to said element so that said element assumes a neutral position whenever said control member and said controlled member are in corresponding positions.

2. In a ram-jet engine having an exit nozzle and a nozzle plug movable in said exit nozzle to vary the effective cross-sectional area thereof, servo-actuating mechanism for moving said nozzle plug, said mechanism comprising a controlled member coupled to said nozzle plug, a reversible servomotor, a reduction gear set operatively connecting said servomotor to said controlled member, a three position mechanical switch for selectively energising said reversible servomotor in one or a reverse direction or de-energising said servomotor, a primary control member for determining the position of said controlled member, an element differentially coupled to said primary control member, a bi-directional spring link coupling said element to said switch, indexing means for holding said switch in any of its three positions and such that the force due to movement of said element in a sense to displace said switch from one position to another is initially imparted to said spring link and resisted by said indexing means to hold said switch in said one position until said element has been moved by a predetermined amount, and a mechanical feed back means coupled to said reduction gear set and differentially coupled to said element so that said element assumes a neutral position whenever said control member and said controlled member are in corresponding positions.

References Cited by the Examiner
UNITED STATES PATENTS

| 1,108,443 | 8/1914 | Jamey | 91—2 |
| 2,367,241 | 1/1945 | Stacy | 91—355 |
| 2,660,985 | 12/1953 | Ernst | 91—2 |
| 2,709,062 | 5/1955 | Lamb | 91—2 |
| 2,750,733 | 6/1956 | Pares et al. | 60—35.6 |
| 2,938,501 | 5/1960 | Titcomb | 91—2 |
| 3,003,475 | 10/1961 | Rouvahs | 91—387 |

FOREIGN PATENTS

| 943,801 | 10/1948 | France. |
| 116,611 | 6/1946 | Sweden. |

MARTIN P. SCHWADRON, *Primary Examiner.*

PAUL E. MASLOUSKY, *Examiner.*